United States Patent
Takanashi

(10) Patent No.: US 8,749,877 B2
(45) Date of Patent: Jun. 10, 2014

(54) AMPLIFYING OPTICAL FIBER AND OPTICAL FIBER AMPLIFIER

(75) Inventor: Tomohiro Takanashi, Sakura (JP)

(73) Assignee: Fujikura Ltd., Tokyo (JP)

( * ) Notice: Subject to any disclaimer, the term of this patent is extended or adjusted under 35 U.S.C. 154(b) by 64 days.

(21) Appl. No.: 13/528,127

(22) Filed: Jun. 20, 2012

(65) Prior Publication Data

US 2012/0275015 A1 Nov. 1, 2012

Related U.S. Application Data

(63) Continuation of application No. PCT/JP2011/053754, filed on Feb. 21, 2011.

(30) Foreign Application Priority Data

Feb. 22, 2010 (JP) ................................ 2010-035659

(51) Int. Cl.
*H01S 3/067* (2006.01)

(52) U.S. Cl.
USPC ............. 359/341.1; 385/126; 385/127; 372/6

(58) Field of Classification Search
USPC ...................... 385/126, 127; 372/6; 359/341.1
See application file for complete search history.

(56) References Cited

U.S. PATENT DOCUMENTS

| | | | |
|---|---|---|---|
| 6,157,763 A | 12/2000 | Grubb et al. | |
| 6,954,575 B2 * | 10/2005 | Fermann et al. | 385/128 |
| 7,034,992 B2 * | 4/2006 | Komine | 359/334 |
| 7,359,604 B2 * | 4/2008 | Po | 385/125 |
| 2006/0029343 A1 | 2/2006 | Farroni et al. | |
| 2006/0029344 A1 | 2/2006 | Farroni et al. | |
| 2006/0198590 A1 | 9/2006 | Farroni et al. | |
| 2006/0245714 A1 | 11/2006 | Farroni et al. | |
| 2010/0067860 A1 | 3/2010 | Ikeda et al. | |
| 2010/0079854 A1 | 4/2010 | Tanigawa et al. | |

FOREIGN PATENT DOCUMENTS

| | | |
|---|---|---|
| JP | 2001-013346 A | 1/2001 |
| JP | 2002-055244 A | 2/2002 |
| JP | 2003-227944 A | 8/2003 |
| JP | 2007-153697 A | 6/2007 |
| WO | 2006/017802 A2 | 2/2006 |
| WO | 2008/133242 A1 | 11/2008 |
| WO | 2009/028614 A1 | 3/2009 |
| WO | 2010/016245 A1 | 2/2010 |

OTHER PUBLICATIONS

International Search Report of PCT/JP2011/053754, mailing date Mar. 15, 2011.

* cited by examiner

*Primary Examiner* — Mark Hellner
(74) *Attorney, Agent, or Firm* — Westerman, Hattori, Daniels & Adrian, LLP

(57) ABSTRACT

An amplifying optical fiber includes a core doped with an active element, a cladding covering the core, and an outer cladding covering the cladding. The cladding meets a relationship of $0.92 \leq r/R \leq 0.97$ where the cladding has a polygonal outer shape in cross section, and the outer shape has an inscribed circle of a diameter r and a circumscribed circle of a diameter R.

6 Claims, 2 Drawing Sheets

AMPLIFYING OPTICAL FIBER AND OPTICAL FIBER AMPLIFIER

TECHNICAL FIELD

The present invention relates to amplifying optical fibers and optical fiber amplifiers using the amplifying optical fibers, and more particularly, to amplifying optical fibers that are capable of absorbing pumping light efficiently and optical fiber amplifiers using the amplifying optical fibers.

BACKGROUND ART

In optical communicators and fiber laser apparatuses, amplifying optical fibers are used in which active elements for optical amplification are doped in cores covered with claddings. In such amplifying optical fibers, it is known that a portion of pumping light propagates through the claddings without being absorbed by the active elements, which causes a skew mode that does not contribute to optical amplification. One of known technologies for suppressing the skew mode is such that an amplifying optical fiber is configured to have a cladding with a D-shaped outer shape or a polygonal outer shape in cross section of the amplifying optical fiber.

The following Patent Document 1 describes an amplifying optical fiber having a cladding with a polygonal outer shape in cross section as described above. In the amplifying optical fiber described in Patent Document 1, difference between the maximum outer diameter and the minimum outer diameter in cross section of the cladding is set to equal to or less than 6% of the average outer diameter.

CITATION LIST

Patent Document

[Patent Document 1] WO2009/028614A

SUMMARY OF INVENTION

Objects to be Achieved by the Invention

However, even with the amplifying optical fiber described in the above Patent Document 1, further efficient absorption of pumping light is sought for.

It is therefore an object of the present invention to provide an amplifying optical fiber allowing for efficient absorption of pumping light by an active element therein, and an optical fiber amplifier using the amplifying optical fiber.

Means for Achieving the Objects

An amplifying optical fiber according to the present invention includes: a core doped with an active element; and a cladding covering the core, and an outer cladding covering the cladding. The cladding meets a relationship of $0.92 \leq r/R \leq 0.97$ where the cladding has a polygonal outer shape in cross section, and the outer shape has an inscribed circle of a diameter r and a circumscribed circle of a diameter R.

With such an amplifying optical fiber, since the ratio (r/R) between the diameter of the inscribed circle and the diameter of the circumscribed circle is set equal to or greater than 0.92, thickness deviation in the outer cladding is reducible. Hence, the cladding is kept from diminishing in its ability of confining pumping light therein, and when the cladding allows pumping light to propagate therethrough, loss of the pumping light is suppressible. Moreover, since r/R is equal to or less than 0.97, the skew mode of pumping light is suppressible. As is described, since loss of pumping light is suppressible and the skew mode is suppressible, effective absorption of pumping light is achieved by the active element doped in the core.

In the amplifying optical fiber, the diameter r of the inscribed circle and the diameter R of the circumscribed circle preferably establish a relationship of $0.92 \leq r/R \leq 0.96$.

With this configuration, the skew mode of pumping light is further suppressible.

Further, in the amplifying optical fiber, the polygonal shape preferably has substantially rounded vertices.

With such an amplifying optical fiber, since the vertices of the polygonal shape are substantially rounded, thickness deviation in the outer cladding is reducible as compared with the case in which the vertices of the polygonal shape are angular. Thus, a concept is included herein in which the polygonal shape may have substantially rounded vertices.

Further, in the amplifying optical fiber, the polygonal shape preferably has vertices by an odd number.

With such an amplifying optical fiber, the outer shape of the cladding does not involve double axial symmetry. Hence, improved controllability over the outer shape of the cladding is achieved at the time of manufacture.

Further, in the amplifying optical fiber, the polygonal shape preferably is any of pentagonal, hexagonal, heptagonal, or octagonal.

In addition, in the amplifying optical fiber, the polygonal shape is preferably heptagonal.

Moreover, in the amplifying optical fiber, the cladding preferably includes a plurality of cladding layers.

With this configuration, leakage of pumping light from the cladding is preventable.

Further, an optical fiber amplifier of the present invention includes the above-described amplifying optical fiber and an pumping light source for outputting pumping light to be input to the amplifying optical fiber.

With the optical fiber amplifier, since the amplifying optical fiber is capable of efficiently absorbing pumping light, the efficiency of optical amplification is improved.

Effect of the Invention

According to the present invention, an amplifying optical fiber allowing for efficient absorption of pumping light, as well as an optical fiber amplifier using the amplifying optical fiber, is provided.

EMBODIMENTS OF THE INVENTION

Preferred embodiments of an optical fiber amplifier according to the present invention are described below in detail with reference to the drawings.

Figure 1:
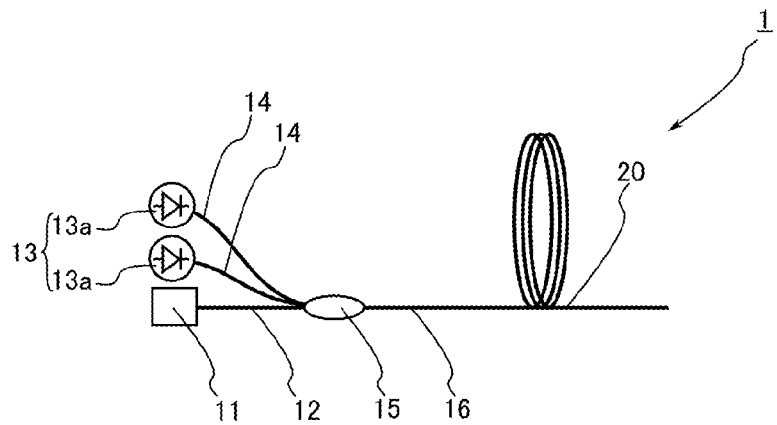
FIG. 1 illustrates an optical fiber amplifier according to an embodiment of the present invention.

FIG. 1 illustrates an optical fiber amplifier according to an embodiment of the present invention.

As illustrated in FIG. 1, an optical fiber amplifier 1 mainly includes a seed light source 11 for outputting seed light, an pumping light source 13 for outputting pumping light, a double-clad fiber 16 to receive seed light and pumping light, a combiner 15 for inputting seed light and pumping light to the double-clad fiber 16, and an amplifying optical fiber 20 having an end connected to the double-clad fiber 16.

The seed light source 11 includes, for example, a laser light source configured by a laser diode, and a fiber laser apparatus of Fabry-Perot type or a fiber ring type. The seed light to be output from the seed light source 11 is not specifically limited, but may be, for example, laser light having a wavelength of 1070 nm. The seed light source 11 is coupled to a seed light propagating fiber 12 including a core and a cladding covering the core, and the seed light to be output from the seed light source 11 propagates through the core of the seed light propagating fiber 12. Exemplary seed light propagating fibers 12 include a single-mode fiber, and in this case, the seed light propagates through the seed light propagating fiber 12 as single-mode light.

The pumping light source 13 includes a plurality of laser diodes 13a. The laser diodes 13a are, in the present embodiment, adapted for semiconductor laser. In the case that the seed light has a wavelength of 1070 nm as mentioned above, the laser diodes 13a output pumping light having, for example, a wavelength of 915 nm. The laser diodes 13a of the pumping light source 13 are connected to pumping light propagating fibers 14, respectively, such that the pumping light to be output from the laser diodes 13a propagates through the pumping light propagating fibers 14. Exemplary pumping light propagating fibers 14 include a multimode fiber. In this case, the pumping light propagates through the pumping light propagating fibers 14 as multimode light.

The combiner 15 to be connected with the pumping light propagating fibers 14 is formed by melt-drawing the seed light propagating fiber 12 and the pumping light propagating fibers 14 into integration, so as to be connected to the double-clad fiber 16.

The double-clad fiber 16 includes a core, a cladding covering the core over the outer periphery thereof, an outer cladding covering the cladding over the outer periphery thereof, and a protective layer covering the outer cladding over the outer periphery thereof. In the double-clad fiber 16, the cladding is lower in refractive index than the core, and the outer cladding is further lower in refractive index than the cladding. Exemplary constituent materials of the core include, for example, quartz doped with a dopant such as aluminum (Al) that has an action to increase the refractive index. Exemplary constituent materials of the cladding include, for example, non-doped quartz. Exemplary constituent materials of the outer cladding include, for example, an ultraviolet curing resin. Exemplary constituent materials of the protective layer include, for example, an ultraviolet curing resin that is different from the material to constitute the outer cladding.

The amplifying optical fiber 20 having an end connected to the double-clad fiber 16 is not connected to anything at its end opposite the side of the double-clad fiber 16, and the non-connected end serves as an output end.

Figure 2:
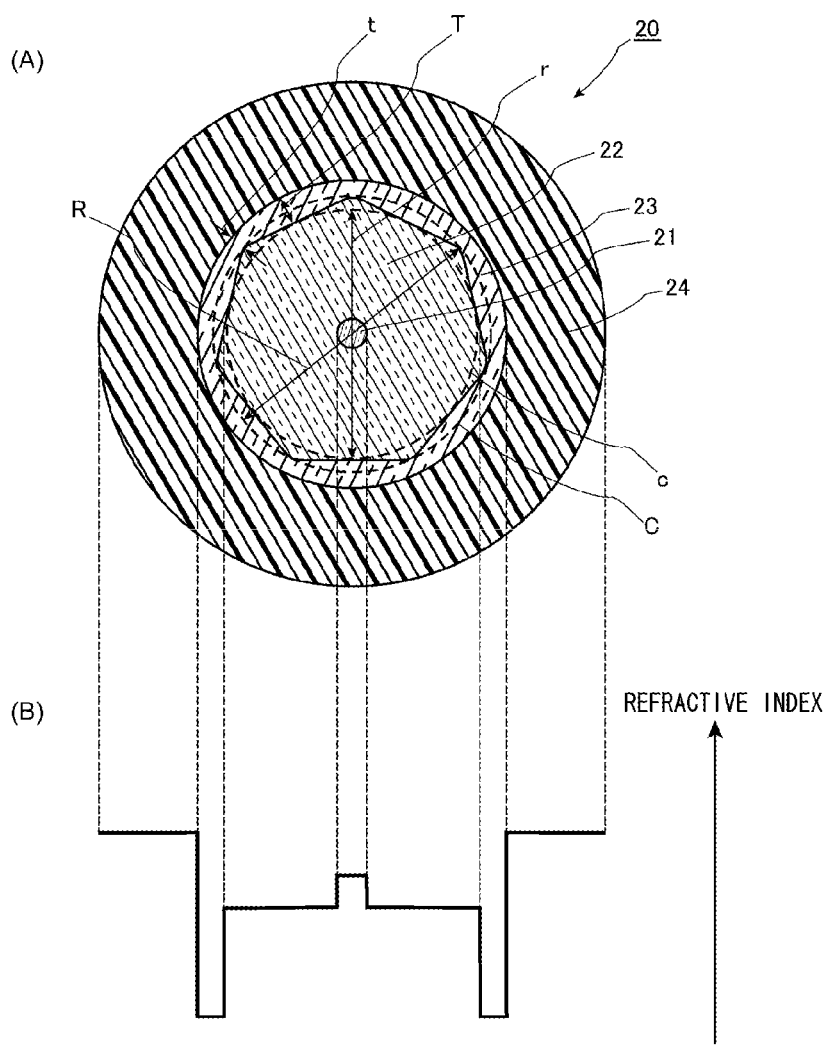
FIG. 2 illustrates a condition of the amplifying optical fiber of FIG. 1.

FIG. 2 illustrates a condition of the amplifying optical fiber 20, and more specifically, FIG. 2 (A) illustrates a condition of the structure of the amplifying optical fiber 20 in a cross section perpendicular to the longitudinal direction, and FIG. 2 (B) illustrates a condition of the refractive index of the amplifying optical fiber 20 in the diameter direction.

As illustrated in FIG. 2 (A), the amplifying optical fiber 20 includes a core 21, a cladding 22 covering the core over the outer periphery thereof, an outer cladding 23 covering the cladding 22 over the outer periphery thereof, and a protective layer 24 covering the outer cladding 23 over the outer periphery thereof. Further, in the cross section of the amplifying optical fiber 20, the core 21 has a circular outer shape, and the cladding 22 has a polygonal outer shape. The outer cladding 23 and the protective layer 24 have circular outer shapes. In the present embodiment, the cladding 22 has a heptagonal outer shape in cross section, and the vertices of the cladding 22 are substantially rounded.

Further, in FIG. 2 (A), the dashed line indicates an inscribed circle c and a circumscribed circle C of the outer shape of the cladding 22 in the cross section of the amplifying optical fiber 20. As is seen from FIG. 2 (A), where the inscribed circle c has a diameter r and the circumscribed circle C has a diameter R, the cladding 22 meets a relationship of $0.92 \leq r/R \leq 0.97$.

Moreover, as illustrated in FIG. 2 (A), in the cross section of the amplifying optical fiber 20, the cladding 22 has a polygonal outer shape, and the outer cladding 23 has a circular outer shape. Thus, the outer cladding 23 involves thickness deviation. In FIG. 2 (A), the outer cladding 23 has a thickness of t at the thinnest portion thereof and a thickness of T at the thickest portion thereof.

In this amplifying optical fiber 20, as illustrated in FIG. 2 (B), the cladding 22 is lower in refractive index than the core 21, the outer cladding 23 is further lower in refractive index than the cladding 22, and the protective layer 24 is higher in refractive index than the core 21.

Exemplary constituent materials of the core 21 include quartz doped with an active element such as ytterbium (Yb) that is excitable by pumping light to be output from the pumping light source 13. This active element is an element excitable upon absorption of pumping light and is, for example, a rare earth element. Exemplary rare earth elements include, in addition to the above-mentioned Yb, thulium (Tm), cerium (Ce), neodymium (Nd), and europium (Eu). Moreover, exemplary active elements include, in addition to rare earth elements, bismuth (Bi) and chromium (Cr). A dopant such as Al that has an action to increase the refractive index of quartz may be co-doped with an active element. Exemplary dopants that have an action to increase the refractive index of quartz include, in addition to the above-mentioned Al, germanium (Ge) and phosphorus (P). Exemplary constituent materials of the cladding 22 include, for example, non-doped pure quartz and quartz doped with a dopant such as fluorine (F) that has an action to decrease the refractive index. The dopant to be doped into the core 21, such as Al, and the dopant to be doped into the cladding 22, such as F, are dopants for adjusting the refractive index; therefore, whether or not such a dopant is doped or not or the kind of the element(s) is not specifically limited. Exemplary constituent materials of the outer cladding include, for example, an ultraviolet curing resin, and exemplary constituent materials of the protective layer 24 include, for example, an ultraviolet curing resin that is different from the material to constitute the outer cladding 23.

The operation of the optical fiber amplifier 1 is described next.

First, seed light is output from the seed light source 11, while pumping light is output from the pumping light source 13. As described above, the seed light to be output from the seed light source 11 at this time has, for example, a wavelength of 1070 nm. The seed light output from the seed light source 11 propagates through the core of the seed light propagating fiber 12 to be input to the combiner 15.

Meanwhile, as described above, the pumping light to be output from the pumping light source 13 has, for example, a wavelength of 915 nm. The pumping light output from the pumping light source 13 propagates through the pumping light propagating fibers 14 to be input to the combiner 15.

The seed light thus input into the combiner 15 propagates through the core of the double-clad fiber 16 to be input to the core 21 of the amplifying optical fiber 20 and to propagate through the core 21. Meanwhile, the pumping light input to the combiner 15 propagates mainly through the cladding of the double-clad fiber 16 to be input to the amplifying optical fiber 20 and to propagate mainly through the cladding 22 of the amplifying optical fiber 20.

Then, while passing through the core 21 of the amplifying optical fiber 20, the pumping light is absorbed into the active element doped in the core 21 to pump the active element. The pumped active element causes stimulated emission, and the stimulated emission causes the seed light to be amplified, so as to be output from the output end of the amplifying optical fiber 20 as output light.

Description is given next of a skew mode of pumping light that occurs when the pumping light propagates through the amplifying optical fiber 20.

Figure 3:
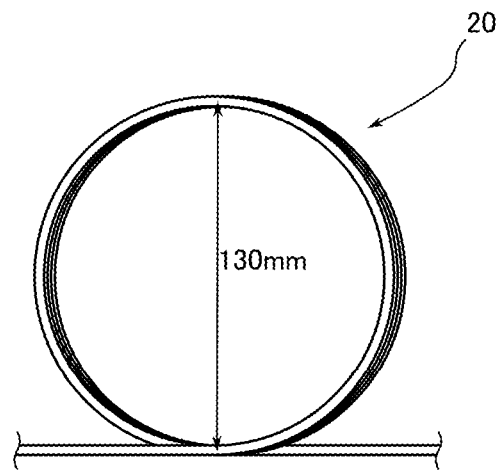
FIG. 3 illustrates a condition in which the amplifying optical fibers of FIG. 1 are bundled.

FIG. 3 illustrates a condition in which the amplifying optical fibers 20 of FIG. 1 are bundled. As illustrated in FIG. 3, the amplifying optical fibers 20 are wound into a circular shape of a diameter of 130 mm for bundling. Then, with seed light stopped from being output from the seed light source 11, pumping light from the pumping light source 13 is input to the amplifying optical fibers 20. The pumping light to be output from the output end at this time has power of W1 (W). The power W1 (W) of the pumping light to be output corresponds to the power of pumping light that has not been absorbed by the amplifying optical fibers 20 in a condition illustrated in FIG. 3. The power of the pumping light that has not been absorbed in this condition corresponds to the power to be generally output from the output end in a condition of normal use of amplifying optical fibers that are configured such that pumping light propagates through the claddings.

Figure 4:
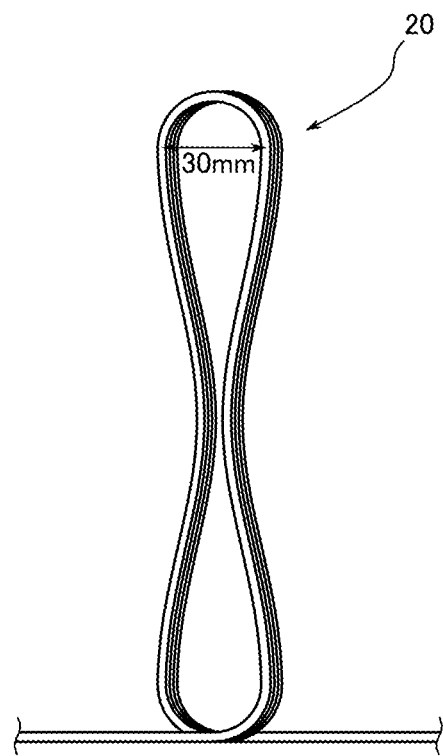
FIG. 4 illustrates a condition in which the bundle of the amplifying optical fibers of FIG. 3 is crushed.

Next, the bundle of the amplifying optical fibers 20 of FIG. 3 is crushed and deformed as illustrated in FIG. 4. At this time, the portion in which the amplifying optical fibers 20 are most acutely bent is made to have a diameter of 30 mm. In this state, as in the condition of FIG. 3 where only pumping light is input to the amplifying optical fibers 20, seed light is stopped from being output from the seed light source 11, and pumping light from the pumping light source 13 is input to the amplifying optical fibers 20. The pumping light to be output from the output end at this time has power of W2 (W). The power W2 (W) of the pumping light to be output corresponds to the power of the pumping light that has not been absorbed by the active element in a state where pumping light that is not absorbable by the active element is reduced as much as possible in the amplifying optical fibers 20.

Further, in the absence of the amplifying optical fibers 20, with seed light stopped from being output from the seed light source 11, pumping light is output from the pumping light source 13 likewise. The pumping light to be output from the double-clad fiber 16 has power of W0 (W). This corresponds to the power of the pumping light to be input to the amplifying optical fibers 20.

Herein, W1−W2 indicates the power of skew light in the amplifying optical fiber 20 of FIG. 1.

Additionally, W0−W2 indicates the power of pumping light that is absorbable by the amplifying optical fiber 20. More specifically, W0−W2 indicates the power of pumping light that allows the amplifying optical fiber 20 to amplify the seed light in the case where seed light and pumping light are input to the amplifying optical fiber 20.

Hence, (W1−W2)/(W0−W2) constitutes (the power of skew light in the amplifying optical fiber 20)/(the power of pumping light that is absorbable by the amplifying optical fiber 20), which represents the ratio of the power of skew light to absorbable light.

When the ratio of the power of skew light to absorbable light exceeds 10%, the rate of increase of skew light starts to increase, and when 13% is exceeded, the skew light further increases abruptly. Hence, in the amplifying optical fiber 20, the ratio of the power of skew light to absorbable light is not favorable, and when 13% is exceeded, the seed light amplification efficiency becomes worse abruptly.

According to the present embodiment however, as described earlier, a relationship of $$r/R \leq 0.97$$

is met, thus a relationship of $$(W1-W2)/(W0-W2)<13\%$$

is established. Hence, the amplifying optical fiber 20 of the present embodiment is configured such that skew light is suppressed, and efficient absorption of pumping light is thus achieved.

Moreover, a relationship of $$r/R \leq 0.96$$

is met, a relationship of $$(W1-W2)/(W0-W2)<10\%$$

is established; thus, with the amplifying optical fiber 20 skew light is further suppressible, and efficient absorption of pumping light is achieved.

Description is given next of leak light in the amplifying optical fiber 20.

It is generally known that, in an amplifying optical fiber, thickness deviation in an outer cladding causes leakage of pumping light. The leakage of pumping light increases abruptly when the thickness T of the outer cladding 23 at a thick portion exceeds 1.4 where the thickness t of the outer cladding 23 at the thinnest portion is defined as 1.

Meanwhile, as described above, since the cladding 22 of the amplifying optical fiber 20 of the present embodiment meets a relationship of $$0.92 \leq r/R,$$

even in cases where thickness deviation in the outer cladding 23 varies at the time of manufacture, the thick portion of the outer cladding 23 has a thickness T that is equal to or less than 1.4 where the thickness t of the outer cladding 23 at the thinnest portion is 1. Hence, leakage of pumping light is effectively suppressed.

As described above, in the amplifying optical fiber 20 of the present embodiment, the ratio (r/R) between the diameter r of the inscribed circle c and the diameter R of the circumscribed circle C establishes a relationship of 0.92≤r/R≤0.97. Hence, the amplifying optical fiber 20 of the present embodiment allows for suppression of loss of pumping light that may be otherwise caused by thickness deviation in the outer cladding 23, and further for suppression of the skew mode of pumping light. Thus, pumping light is efficiently absorbable by the active element doped in the core 21. Hence, the optical fiber amplifier 1 of the present embodiment using such an amplifying optical fiber 20 is capable of performing efficient optical amplification.

Further, in the case where the ratio (r/R) between the diameter r of the inscribed circle c and the diameter R of the circumscribed circle C establishes a relationship of $0.92 \leq r/R \leq 0.96$, the amplifying optical fiber 20 achieves further suppression of the skew mode of pumping light and efficient absorption of pumping light. Thus, the optical fiber amplifier 1 using such an amplifying optical fiber 20 is capable of performing optical amplification still further efficiently.

Since the amplifying optical fiber 20 of the present embodiment is configured such that the cladding 22 has an outer shape with substantially rounded vertices in cross section, thickness deviation in the outer cladding 23 is reducible to a greater degree than in the case of angular polygonal vertices.

The present invention has been illustrated in connection with embodiments, but the present invention is not limited to the foregoing embodiment.

For example, in the above embodiment, the vertices of the outer shape of the cladding 22 are substantially rounded in the cross section of the amplifying optical fiber 20; however, the present invention is not limited thereto, and the vertices of the outer shape of the cladding 22 may be angular.

Further, in the above embodiment, the cladding 22 has a heptagonal outer shape in the cross section of the amplifying optical fiber 20; however, the present invention is not limited thereto, and another polygonal shape may be adopted. An outer shape of the cladding 22 with vertices of an odd number does not entail double axial symmetry; thus, improved controllability over the outer shape of the cladding 22 is achieved at the time of manufacture. In addition, the number of the vertices of the outer shape of the cladding 22 preferably is in a range of five to eight, for facilitating the manufacture.

Moreover, in the above embodiment, the cladding 22 of the amplifying optical fiber 20 is configured in a single layer; however, the present invention is not limited thereto, and the cladding 22 may comprise a plurality of layers. In this case, leakage of pumping light from the cladding is further prevented.

EXAMPLES

The subject matter of the present invention is described more specifically by way of Examples and Comparative Examples, but the present invention is not limited thereto.

Example 1

An intermediate of an optical fiber base material was fabricated by the MCVD process by using quartz that is co-doped with Yb by 1.2% by mass and Al by 3.5% by mass as constituent materials of a core base material and non-doped quartz as a cladding base material, with the outer periphery of the core base material covered with the cladding base material. Then, the intermediate of the optical fiber base material was subjected to cutting process, so as to fabricate an optical fiber base material with the cladding base material having a heptagonal outer shape in a cross section that is perpendicular to the longitudinal direction. Next, the optical fiber base material was spun, and the cladding was further covered over the outer periphery thereof with an outer cladding made of an ultraviolet curing resin. Moreover, the outer cladding was covered over the outer periphery thereof with a protective layer made of an ultraviolet curing resin to fabricate an amplifying optical fiber of 10 m in length. During spinning, the temperature of the spinning furnace was controlled so as for the cladding to have an outer shape with substantially rounded vertices in cross section.

The amplifying optical fiber thus fabricated had a core diameter of 7 μm. The diameter r of the inscribed circle and the diameter R of the circumscribed circle of the cladding had dimensions as shown in Table 1. Hence, the value shown in Table 1 was obtained with respect to r/R. The outer diameter of the outer cladding was 160 μm.

Examples 2 to 4

Amplifying optical fibers were fabricated in the same manner as in Example 1 except that the spinning furnace during spinning was adjusted to temperatures different from that in Example 1, and that the vertices of the outer shapes in cross section of the claddings were rounded in different manners from Example 1. The amplifying optical fibers thus fabricated had the claddings with the inscribed circles of diameters r and the circumscribed circles of diameters R sized as shown in Table 1. Hence, the values shown in Table 1 were obtained with respect to r/R in the amplifying optical fibers of Examples 2 to 4. The outer diameters of the outer claddings were the same as that of Example 1.

Comparative Examples 1 to 3

Amplifying optical fibers were fabricated in the same manner as in Example 1 except that the spinning furnace during spinning was adjusted to temperatures different from those in Examples 1 to 4, and that the vertices of the outer shapes in cross section of the claddings were rounded in different manners from Examples 1 to 4. The amplifying optical fibers thus fabricated had the claddings with the inscribed circles of diameters r and the circumscribed circles of diameters R sized as shown in Table 1. Hence, the values shown in Table 1 were obtained with respect to r/R in the amplifying optical fibers of Comparative Examples 1 to 3. The outer diameters of the outer claddings were the same as that of Example 1.

TABLE 1

| | r (μm) | R (μm) | r/R | W0(W) | W1(W) | W2(W) | $\frac{W1-W2}{W0-W2}$ (%) | Average Value in Thickness Deviation | Variation in Thickness Deviation Positive Direction | Variation in Thickness Deviation Negative Direction |
|---|---|---|---|---|---|---|---|---|---|---|
| Comparative Example 1 | 133.2 | 145.6 | 0.915 | 0.44 | 0.248 | 0.238 | 4.95 | 1.31 | 0.25 | 0.20 |
| Example 1 | 133.6 | 145.2 | 0.92 | 0.44 | 0.248 | 0.238 | 4.95 | 1.18 | 0.20 | 0.13 |
| Example 2 | 134.5 | 143.9 | 0.935 | 0.44 | 0.249 | 0.239 | 4.98 | 1.08 | 0.16 | 0.07 |
| Example 3 | 135.9 | 142.6 | 0.953 | 0.44 | 0.252 | 0.239 | 6.47 | 1.06 | 0.12 | 0.06 |
| Example 4 | 137.2 | 141.4 | 0.97 | 0.44 | 0.261 | 0.240 | 10.50 | 1.05 | 0.10 | 0.05 |
| Comparative Example 2 | 138.5 | 140.6 | 0.985 | 0.44 | 0.269 | 0.241 | 14.07 | 1.05 | 0.10 | 0.05 |
| Comparative Example 3 | 139.2 | 139.2 | 1 | 0.44 | 0.290 | 0.242 | 24.24 | 1.05 | 0.10 | 0.04 |

Next, the optical fiber amplifiers as illustrated in FIG. 1 were fabricated using the amplifying optical fibers of Examples 1 to 4 and Comparative Examples 1 to 3.

Next, the amplifying optical fibers were bundled into a circular shape with a diameter of 130 mm as illustrated in FIG. 3 in each of the optical fiber amplifiers. In this state, pumping light having a wavelength of 915 nm was output from the pumping light sources, and the seed light sources were stopped from outputting seed light. Measurement was performed on the power of transmission light output from the amplifying optical fibers in each of the optical fiber amplifiers, and the power was defined as W1. The power W1 of the transmission light in this state was as shown in Table 1. In each of the optical fiber amplifiers, W0 was the power as shown in Table 1 where W0 is the power of pumping light output in the absence of the amplifying optical fibers.

Then, in each of the optical fiber amplifiers, the bundle of the amplifying optical fibers was crushed from the circular condition as illustrated in FIG. 4, such that the portion in which the amplifying optical fibers are bent most acutely was made to have a diameter of 30 mm. Then, pumping light with the same power as above was output from the pumping light source. Subsequently, measurement was performed on the power of transmission light output from the amplifying optical fibers and the power was defined as W2. The power W2 of the transmission light in this state was the power shown in Table 1.

Then, (W1−W2)/(W0−W2) was found using W0, W1, and W2 that were obtained from the measurement. The (W1−W2)/(W0−W2) is, as described earlier, (the power of skew light in the amplifying optical fiber)/(the power of pumping light absorbable by the amplifying optical fiber), which represents the ratio of the power of skew light to absorbable light. The result was shown in Table 1.

As seen from the result shown in Table 1, the amplifying optical fibers of Examples 1 to 4 had the ratios of the power of skew light to absorbable light of less than 13%. Hence, it was found that the amplifying optical fibers of Examples 1 to 4 achieve suppression of skew light and efficient absorption of pumping light. Especially, the amplifying optical fibers of Examples 1 to 3 had r/R equal to or less than 0.96, and the ratios of the power of skew light to absorbable light were less than 10%. Hence, it was found that the amplifying optical fibers of Examples 1 to 3 achieve suppression of skew light and more efficient absorption of pumping light.

Meanwhile, the amplifying optical fibers of Comparative Examples 2 and 3 showed the result that the ratios of the power of skew light to absorbable light is greater than 13%. Hence, it was found that the amplifying optical fibers of Comparative Examples 2 and 3 neither achieve suppression of skew light nor efficient absorption of pumping light.

Next, the cross sections of the amplifying optical fibers of Examples 1 to 4 and Comparative Examples 1 to 3 were obtained by cutting at ten positions, and the cross-sectional surfaces were microscopically observed. Then, measurement was conducted on the magnitude of thickness deviation in the respective outer claddings of the amplifying optical fibers, and average values and variations in thickness deviation were found. Table 1 shows the result.

As seen from the result shown in Table 1, even in the case where variations were taken into consideration, the amplifying optical fibers of Examples 1 to 4 each had a thickness of the outer cladding equal to or less than 1.4 at a thick portion of the outer cladding where the thickness of the outer cladding at the thinnest portion is defined as 1. Hence, it was found that the amplifying optical fibers of Examples 1 to 4 achieve effective suppression of leakage of pumping light.

Meanwhile, in the case where variations were taken into consideration, the amplifying optical fiber of Comparative Example 1 showed a result that the thickness of the outer cladding at a thick portion exceeds 1.4 in some cases where the thickness of the outer cladding at the thinnest portion is defined as 1. Hence, it was found that the amplifying optical fiber of Comparative Example 1 is unable to effectively suppress leakage of pumping light in some cases.

Example 5

An optical fiber base material was fabricated in the same manner as the optical fiber base material of Example 1. Then, the temperature of the spinning furnace and the spinning speed were adjusted differently from those for Example 1 to fabricate an amplifying optical fiber that is different in diameter from Example 1. The amplifying optical fiber thus fabricated had a core diameter of 30 μm. The diameter r of the inscribed circle and the diameter R of the circumscribed circle of the cladding had dimensions as shown in Table 2. Hence, the value shown in Table 2 was obtained with respect to r/R. The outer diameter of the outer cladding was 460 μm.

Example 6

An amplifying optical fiber was fabricated in the same manner as in Example 5 except that the spinning furnace during spinning was adjusted to a temperature different from that in Example 5, and that the vertices of the outer shape in cross section of the cladding were rounded in a different manner from Example 5. The amplifying optical fiber thus fabricated had the cladding with the inscribed circle of a diameter r and the circumscribed circle of a diameter R sized as shown in Table 2. Hence, the value shown in Table 2 was obtained with respect to r/R in the amplifying optical fiber of Example 6. The outer diameter of the outer cladding was the same as that of Example 5.

Comparative Examples 4 to 6

TABLE 2

| | r (μm) | R (μm) | r/R | W0(W) | W1(W) | W2(W) | $\frac{W1-W2}{W0-W2}$ (%) | Average Value in Thickness Deviation | Variation in Thickness Deviation | |
|---|---|---|---|---|---|---|---|---|---|---|
| | | | | | | | | | Positive Direction | Negative Direction |
| Comparative Example 4 | 409.6 | 450.1 | 0.91 | 1 | 0.149 | 0.112 | 4.17 | 1.31 | 0.24 | 0.18 |
| Comparative Example 5 | 410.9 | 449.1 | 0.915 | 1 | 0.150 | 0.113 | 4.17 | 1.25 | 0.21 | 0.17 |
| Example 5 | 418.9 | 444.7 | 0.942 | 1 | 0.176 | 0.115 | 6.89 | 1.05 | 0.09 | 0.05 |
| Example 6 | 423.8 | 438.3 | 0.967 | 1 | 0.228 | 0.116 | 12.67 | 1.04 | 0.08 | 0.04 |
| Comparative Example 6 | 427.5 | 434.9 | 0.983 | 1 | 0.375 | 0.118 | 29.14 | 1.03 | 0.08 | 0.03 |

Next, the optical fiber amplifiers as illustrated in FIG. 1 were fabricated using the amplifying optical fibers of Examples 5 and 6 and Comparative Examples 4 to 6.

Next, the amplifying optical fibers were bundled into a circular shape with a diameter of 130 mm as illustrated in FIG. 3 in each of the optical fiber amplifiers. In this state, pumping light having a wavelength of 915 nm was output from the pumping light sources, and the seed light sources were stopped from outputting seed light. Measurement was performed on the power of transmission light output from the amplifying optical fibers in each of the optical fiber amplifiers, and the power was defined as W1. The power W1 of the transmission light in this state was as shown in Table 2. In each of the optical fiber amplifiers, W0 was the power as shown in Table 2 where W0 is the power of pumping light output in the absence of the amplifying optical fibers.

Then, in each of the optical fiber amplifiers, the bundle of the amplifying optical fibers was crushed from the circular condition as illustrated in FIG. 4, such that the portion in which the amplifying optical fibers are bent most acutely was made to have a diameter of 30 mm. Then, pumping light with the same power as above was output from the pumping light source. Subsequently, measurement was performed on the power of transmission light output from the amplifying optical fibers and the power was defined as W2. The power W2 of the transmission light in this state was the power shown in Table 2.

Then, (W1−W2)/(W0−W2) was found using W0, W1, and W2 that were obtained from the measurement. The (W1−W2)/(W0−W2) is, as described earlier, (the power of skew light in the amplifying optical fiber)/(the power of pumping light absorbable by the amplifying optical fiber), which represents the ratio of the power of skew light to absorbable light. The result is shown in Table 2.

As seen from the result shown in Table 2, the amplifying optical fibers of Examples 5 and 6 had the ratios of the power of skew light to absorbable light of less than 13%. Hence, it was found that the amplifying optical fibers of Examples 5 and 6 achieve suppression of skew light and efficient absorption of pumping light. Especially, the amplifying optical fiber of Example 5 had r/R equal to or less than 0.96, and the ratio of the power of skew light to absorbable light was less than 10%. Hence, it was found that the amplifying optical fiber of Example 5 achieves suppression of skew light and more efficient absorption of pumping light.

Meanwhile, the amplifying optical fiber of Comparative Example 6 showed the result that the ratio of the power of skew light to absorbable light is greater than 13%. Hence, it was found that the amplifying optical fiber of Comparative Example 6 neither achieves suppression of skew light nor efficient absorption of pumping light.

Next, the cross sections of the amplifying optical fibers of Examples 5 and 6 and Comparative Examples 4 to 6 were obtained by cutting at ten positions, and the cross-sectional surfaces were microscopically observed. Then, measurement was conducted on the magnitude of thickness deviation in the respective outer claddings of the amplifying optical fibers, and average values and variations in thickness deviation were found. Table 2 shows the result.

As seen from the result shown in Table 2, even in the case where variations were taken into consideration, the amplifying optical fibers of Examples 5 and 6 each had a thickness equal to or less than 1.4 at a thick portion of the outer cladding where the thickness of the outer cladding at the thinnest portion is defined as 1. Hence, it was found that the amplifying optical fibers of Examples 5 and 6 achieve effective suppression of leakage of pumping light.

Meanwhile, in the case where variations were taken into consideration, each of the amplifying optical fibers of Comparative Examples 4 and 5 showed a result that the thickness of the outer cladding at a thick portion exceeds 1.4 in some cases where the thickness of the outer cladding at the thinnest portion is defined as 1, and hence, it was found that effectively suppression of leakage of pumping light is not achieved in some cases.

Example 7

An intermediate of an optical fiber base material was fabricated in the same manner as in Example 1. Then, the intermediate of the optical fiber base material thus fabricated was subjected to cutting process, so as to fabricate an optical fiber base material with the cladding having a pentagonal outer shape in a cross section that is perpendicular to the longitudinal direction. Next, the optical fiber base material was spun, and the cladding was further covered over the outer periphery thereof with an outer cladding made of an ultraviolet curing resin. Moreover, the outer cladding was covered over the outer periphery thereof with a protective layer made of an ultraviolet curing resin to fabricate an amplifying optical fiber with the same length as that of Example 1. During spinning, the temperature of the spinning furnace was controlled so as for the cladding to have an outer shape with substantially rounded vertices in cross section.

The amplifying optical fiber thus fabricated had the same core diameter as that of Example 1. The diameter r of the inscribed circle and the diameter R of the circumscribed circle of the cladding had dimensions as shown in Table 3. Hence, the value shown in Table 3 was obtained with respect to r/R. The outer diameter of the outer cladding was 160 μm.

Examples 8 and 9

Amplifying optical fibers were fabricated in the same manner as in Example 7 except that the spinning furnace during spinning was adjusted to temperatures different from that in Example 7, and that the vertices of the outer shapes in cross section of the claddings were rounded in different manners from Example 7. The amplifying optical fibers thus fabricated had the claddings with the inscribed circles of diameters r and the circumscribed circles of diameters R sized as shown in Table 3. Hence, the values shown in Table 3 were obtained with respect to r/R in the amplifying optical fibers of Examples 8 and 9. The outer diameters of the outer claddings were the same as that of Example 7.

Comparative Examples 7 and 8

Amplifying optical fibers were fabricated in the same manner as in Example 7 except that the spinning furnace during spinning was adjusted to temperatures different from those in Examples 7 to 9, and that the vertices of the outer shapes in cross section of the claddings were rounded in different manners from Examples 7 to 9. The amplifying optical fibers thus fabricated had the claddings with the inscribed circles of diameters r and the circumscribed circles of diameters R sized as shown in Table 3. Hence, the values shown in Table 3 were obtained with respect to r/R in the amplifying optical fibers of Comparative Examples 7 and 8. The outer diameters of the outer claddings were the same as that of Example 7.

TABLE 3

|  | r (μm) | R (μm) | r/R | W0(W) | W1(W) | W2(W) | $\frac{W1-W2}{W0-W2}$ (%) | Average Value in Thickness Deviation | Variation in Thickness Deviation Positive Direction | Variation in Thickness Deviation Negative Direction |
|---|---|---|---|---|---|---|---|---|---|---|
| Comparative Example 7 | 131.9 | 144.2 | 0.915 | 0.44 | 0.243 | 0.235 | 3.90 | 1.37 | 0.23 | 0.2 |
| Example 7 | 132.4 | 143.8 | 0.921 | 0.44 | 0.243 | 0.235 | 3.90 | 1.24 | 0.15 | 0.13 |
| Example 8 | 134.3 | 142.1 | 0.945 | 0.44 | 0.245 | 0.236 | 4.41 | 1.12 | 0.13 | 0.09 |
| Example 9 | 135.9 | 140.2 | 0.969 | 0.44 | 0.256 | 0.237 | 9.36 | 1.07 | 0.1 | 0.07 |
| Comparative Example 8 | 137.0 | 139.5 | 0.982 | 0.44 | 0.267 | 0.239 | 13.93 | 1.06 | 0.09 | 0.06 |

Next, the optical fiber amplifiers as illustrated in FIG. 1 were fabricated using the amplifying optical fibers of Examples 7 to 9 and Comparative Examples 7 and 8.

Next, the amplifying optical fibers were bundled into a circular shape with a diameter of 130 mm as illustrated in FIG. 3 in each of the optical fiber amplifiers. In this state, pumping light having a wavelength of 915 nm was output from the pumping light sources, and the seed light sources were stopped from outputting seed light. Measurement was performed on the power of transmission light output from the amplifying optical fibers in each of the optical fiber amplifiers, and the power was defined as W1. The power W1 of the transmission light in this state was as shown in Table 3. In each of the optical fiber amplifiers, W0 was the power as shown in Table 3 where W0 is the power of pumping light output in the absence of the amplifying optical fibers.

Then, in each of the optical fiber amplifiers, the bundle of the amplifying optical fibers was crushed from the circular condition as illustrated in FIG. 4, such that the portion in which the amplifying optical fibers are bent most acutely was made to have a diameter of 30 mm. Then, pumping light with the same power as above was output from the pumping light source. Subsequently, measurement was performed on the power of transmission light output from the amplifying optical fibers and the power was defined as W2. The power W2 of the transmission light in this state was the power shown in Table 3.

Then, (W1−W2)/(W0−W2) was found using W0, W1, and W2 that were obtained from the measurement. The (W1−W2)/(W0−W2) is, as described earlier, (the power of skew light in the amplifying optical fiber)/(the power of pumping light absorbable by the amplifying optical fiber), which represents the ratio of the power of skew light to absorbable light. The result is shown in Table 3.

As seen from the result shown in Table 3, the amplifying optical fibers of Examples 7 to 9 had the ratios of the power of skew light to absorbable light of less than 13%. Hence, it was found that the amplifying optical fibers of Examples 7 to 9 achieve suppression of skew light and efficient absorption of pumping light. In addition, the amplifying optical fibers of Examples 7 and 8 showed the result of having r/R equal to or less than 0.96, and that the ratios of the power of skew light to absorbable light were less. Hence, it was found that the amplifying optical fibers of Examples 7 and 8 achieve suppression of skew light and more efficient absorption of pumping light.

Meanwhile, the amplifying optical fiber of Comparative Example 8 showed the result that the ratio of the power of skew light to absorbable light is greater than 13%. Hence, it was found that the amplifying optical fiber of Comparative Example 8 neither achieves suppression of skew light nor efficient absorption of pumping light.

Next, the cross sections of the amplifying optical fibers of Examples 7 to 9 and Comparative Examples 7 and 8 were obtained by cutting at ten positions, and the cross-sectional surfaces were microscopically observed. Then, measurement was conducted on the magnitude of thickness deviation in the respective outer claddings of the amplifying optical fibers, and average values and variations in thickness deviation were found. Table 3 shows the result.

As seen from the result shown in Table 3, even in the case where variations were taken into consideration, the amplifying optical fibers of Examples 7 to 9 each had a thickness of the outer cladding equal to or less than 1.4 at a thick portion of the outer cladding where the thickness of the outer cladding at the thinnest portion was defined as 1. Hence, it was found that the amplifying optical fibers of Examples 7 to 9 achieve effective suppression of leakage of pumping light.

Meanwhile, in the case where variations were taken into consideration, the amplifying optical fiber of Comparative Example 7 showed a result that the thickness of the outer cladding at a thick portion exceeds 1.4 in some cases where the thickness of the outer cladding at the thinnest portion is defined as 1. Hence, it was found that the amplifying optical fiber of Comparative Example 7 is unable to effectively suppress leakage of pumping light in some cases.

Example 10

An intermediate of an optical fiber base material was fabricated in the same manner as in Example 1. Then, the intermediate of the optical fiber base material thus fabricated was subjected to cutting process, so as to fabricate an optical fiber base material having a hexagonal outer shape in a cross section that is perpendicular to the longitudinal direction. Next, the optical fiber base material was spun, and the cladding was further covered over the outer periphery thereof with an outer cladding made of an ultraviolet curing resin. Moreover, the outer cladding was covered over the outer periphery thereof with a protective layer made of an ultraviolet curing resin to fabricate an amplifying optical fiber with the same length as that of Example 1. During spinning, the temperature of the spinning furnace was controlled so as for the cladding to have an outer shape with substantially rounded vertices in cross section.

The amplifying optical fiber thus fabricated had a core diameter of 7 μm. The diameter r of the inscribed circle and the diameter R of the circumscribed circle of the cladding had dimensions as shown in Table 4. Hence, the value shown in Table 4 was obtained with respect to r/R. The outer diameter of the outer cladding was 160 μm.

Examples 11 and 12

Amplifying optical fibers were fabricated in the same manner as in Example 10 except that the spinning furnace during spinning was adjusted to temperatures different from that in Example 10, and that the vertices of the outer shapes in cross section of the claddings were rounded in different manners from Example 10. The amplifying optical fibers thus fabricated had the claddings with the inscribed circles of diameters r and the circumscribed circles of diameters R sized as shown in Table 4. Hence, the values shown in Table 4 were obtained with respect to r/R in the amplifying optical fibers of Examples 11 and 12. The outer diameters of the outer claddings were the same as that of Example 10.

Comparative Examples 9 and 10

Amplifying optical fibers were fabricated in the same manner as in Example 10 except that the spinning furnace during spinning was adjusted to temperatures different from those in Examples 10 to 12, and that the vertices of the outer shapes in cross section of the claddings were rounded in different manners from Examples 10 to 12. The amplifying optical fibers thus fabricated had the claddings with the inscribed circles of diameters r and the circumscribed circles of diameters R sized as shown in Table 4. Hence, the values shown in Table 4 were obtained with respect to r/R in the amplifying optical fibers of Comparative Examples 9 and 10. The outer diameters of the outer claddings were the same as that of Example 10.

W2/(W0−W2) is, as described earlier, (the power of skew light in the amplifying optical fiber)/(the power of pumping light absorbable by the amplifying optical fiber), which represents the ratio of the power of skew light to absorbable light. The result is shown in Table 4.

As seen from the result shown in Table 4, the amplifying optical fibers of Examples 10 to 12 had the ratios of the power of skew light to absorbable light of less than 13%. Hence, it was found that the amplifying optical fibers of Examples 10 to 12 achieve suppression of skew light and efficient absorption of pumping light. In addition, the amplifying optical fibers of Examples 10 and 11 showed the result of having r/R equal to or less than 0.96, and that the ratios of the power of skew light to absorbable light were less. Hence, it was found that the amplifying optical fibers of Examples 10 and 11 achieve suppression of skew light and more efficient absorption of pumping light.

Meanwhile, the amplifying optical fiber of Comparative Example 10 showed the result that the ratio of the power of skew light to absorbable light is greater than 13%. Hence, it was found that the amplifying optical fiber of Comparative Example 10 neither achieves suppression of skew light nor efficient absorption of pumping light.

TABLE 4

| | r (μm) | R (μm) | r/R | W0(W) | W1(W) | W2(W) | $\frac{W1-W2}{W0-W2}$ (%) | Average Value in Thickness Deviation | Variation in Thickness Deviation Positive Direction | Variation in Thickness Deviation Negative Direction |
|---|---|---|---|---|---|---|---|---|---|---|
| Comparative Example 9 | 131.7 | 144.2 | 0.913 | 0.44 | 0.244 | 0.236 | 3.92 | 1.34 | 0.25 | 0.19 |
| Example 10 | 132.3 | 143.5 | 0.922 | 0.44 | 0.245 | 0.237 | 3.94 | 1.22 | 0.14 | 0.13 |
| Example 11 | 134.5 | 141.9 | 0.948 | 0.44 | 0.248 | 0.237 | 5.42 | 1.1 | 0.13 | 0.08 |
| Example 12 | 136.0 | 140.5 | 0.968 | 0.44 | 0.257 | 0.238 | 9.41 | 1.06 | 0.1 | 0.06 |
| Comparative Example 10 | 136.9 | 139.8 | 0.979 | 0.44 | 0.268 | 0.239 | 14.43 | 1.05 | 0.09 | 0.05 |

Next, the optical fiber amplifiers as illustrated in FIG. 1 were fabricated using the amplifying optical fibers of Examples 10 to 12 and Comparative Examples 9 and 10.

Next, the amplifying optical fibers were bundled into a circular shape with a diameter of 130 mm as illustrated in FIG. 3 in each of the optical fiber amplifiers. In this state, pumping light having a wavelength of 915 nm was output from the pumping light sources, and the seed light sources were stopped from outputting seed light. Measurement was performed on the power of transmission light output from the amplifying optical fibers in each of the optical fiber amplifiers, and the power was defined as W1. The power W1 of the transmission light in this state was as shown in Table 4. In each of the optical fiber amplifiers, W0 was the power as shown in Table 4 where W0 is the power of pumping light output in the absence of the amplifying optical fibers.

Then, in each of the optical fiber amplifiers, the bundle of the amplifying optical fibers was crushed from the circular condition as illustrated in FIG. 4, such that the portion in which the amplifying optical fibers are bent most acutely was made to have a diameter of 30 mm. Then, pumping light with the same power as above was output from the pumping light source. Subsequently, measurement was performed on the power of transmission light output from the amplifying optical fibers and the power was defined as W2. The power W2 of the transmission light in this state was the power shown in Table 4.

Then, (W1−W2)/(W0−W2) was found using W0, W1, and W2 that were obtained from the measurement. The (W1−

Next, the cross sections of the amplifying optical fibers of Examples 10 to 12 and Comparative Examples 9 and 10 were obtained by cutting at ten positions, and the cross-sectional surfaces were microscopically observed. Then, measurement was conducted on the magnitude of thickness deviation in the respective outer claddings of the amplifying optical fibers, and average values and variations in thickness deviation were found. Table 4 shows the result.

As seen from the result shown in Table 4, even in the case where variations were taken into consideration, the amplifying optical fibers of Examples 10 to 12 each had a thickness of the outer cladding equal to or less than 1.4 at a thick portion where the thickness of the outer cladding at the thinnest portion was defined as 1. Hence, it was found that the amplifying optical fibers of Examples 10 to 12 achieve effective suppression of leakage of pumping light.

Meanwhile, in the case where variations were taken into consideration, the amplifying optical fiber of Comparative Example 9 showed a result that the thickness of the outer cladding at a thick portion exceeds 1.4 in some cases where the thickness of the outer cladding at the thinnest portion is defined as 1. Hence, it was found that the amplifying optical fiber of Comparative Example 9 is unable to effectively suppress leakage of pumping light in some cases.

Example 13

An intermediate of an optical fiber base material was fabricated in the same manner as in Example 1. Then, the intermediate of the optical fiber base material thus fabricated was subjected to cutting process, so as to fabricate an optical fiber base material having an octagonal outer shape in a cross section that is perpendicular to the longitudinal direction. Next, the optical fiber base material was spun, and the cladding was further covered over the outer periphery thereof with an outer cladding made of an ultraviolet curing resin. Moreover, the outer cladding was covered over the outer periphery thereof with a protective layer made of an ultraviolet curing resin to fabricate an amplifying optical fiber with the same length as that of Example 1. During spinning, the temperature of the spinning furnace was controlled so as for the cladding to have an outer shape with substantially rounded vertices in cross section.

The amplifying optical fiber thus fabricated had a core diameter of 7 μm. The diameter r of the inscribed circle and the diameter R of the circumscribed circle of the cladding had dimensions as shown in Table 5. Hence, the value shown in Table 5 was obtained with respect to r/R. The outer diameter of the outer cladding was 160 μm.

Example 14

An amplifying optical fiber was fabricated in the same manner as in Example 13 except that the spinning furnace during spinning was adjusted to a temperature different from that in Example 13, and that the vertices of the outer shape in cross section of the cladding were rounded in a different manner from Example 13. The amplifying optical fiber thus fabricated had the cladding with the inscribed circle of a diameter r and the circumscribed circle of a diameter R sized as shown in Table 5. Hence, the value shown in Table 5 was obtained with respect to r/R in the amplifying optical fiber of Example 14. The outer diameter of the outer cladding was the same as that of Example 13.

Comparative Example 11

An amplifying optical fiber was fabricated in the same manner as in Example 13 except that the spinning furnace during spinning was adjusted to a temperature different from those in Examples 13 and 14, and that the vertices of the outer shape in cross section of the cladding were rounded in a different manner from Examples 13 and 14. The amplifying optical fiber thus fabricated had the cladding with the inscribed circle of a diameter r and the circumscribed circle of a diameter R sized as shown in Table 5. Hence, the value shown in Table 5 was obtained with respect to r/R in the amplifying optical fiber of Comparative Example 11. The outer diameter of the outer cladding was the same as that of Example 13.

Next, the optical fiber amplifiers as illustrated in FIG. 1 were fabricated using the amplifying optical fibers of Examples 13 and 14 and Comparative Example 11.

Next, the amplifying optical fibers were bundled into a circular shape with a diameter of 130 mm as illustrated in FIG. 3 in each of the optical fiber amplifiers. In this state, pumping light having a wavelength of 915 nm was output from the pumping light sources, and the seed light sources were stopped from outputting seed light. Measurement was performed on the power of transmission light output from the amplifying optical fibers in each of the optical fiber amplifiers, and the power was defined as $W1$. The power $W1$ of the transmission light in this state was as shown in Table 5. In each of the optical fiber amplifiers, $W0$ was the power as shown in Table 5 where $W0$ is the power of pumping light output in the absence of the amplifying optical fibers.

Then, in each of the optical fiber amplifiers, the bundle of the amplifying optical fibers was crushed from the circular condition as illustrated in FIG. 4, such that the portion in which the amplifying optical fibers are bent most acutely was made to have a diameter of 30 mm. Then, pumping light with the same power as above was output from the pumping light source. Subsequently, measurement was performed on the power of transmission light output from the amplifying optical fibers and the power was defined as $W2$. The power $W2$ of the transmission light in this state was the power shown in Table 5.

Then, $(W1-W2)/(W0-W2)$ was found using $W0$, $W1$, and $W2$ that were obtained from the measurement. The $(W1-W2)/(W0-W2)$ is, as described earlier, (the power of skew light in the amplifying optical fiber)/(the power of pumping light absorbable by the amplifying optical fiber), which represents the ratio of the power of the skew light to absorbable light. The result is shown in Table 5.

As seen from the result shown in Table 5, the amplifying optical fibers of Examples 13 and 14 had the ratios of the power of skew light to absorbable light of less than 13%. Hence, it was found that the amplifying optical fibers of Examples 13 and 14 achieve suppression of skew light and efficient absorption of pumping light. In addition, the amplifying optical fiber of Example 13 showed the result of having r/R equal to or less than 0.96, and that the ratio of the power of skew light to absorbable light was less than 10%. Hence, it was found that Example 13 achieves suppression of skew light and more efficient absorption of pumping light.

Meanwhile, the amplifying optical fiber of Comparative Example 11 showed the result that the ratio of the power of skew light to absorbable light is greater than 13%. Hence, it was found that the amplifying optical fiber of Comparative Example 11 neither achieves suppression of skew light nor efficient absorption of pumping light.

Next, the cross sections of the amplifying optical fibers of Examples 13 and 14 and Comparative Example 11 were obtained by cutting at ten positions, and the cross-sectional surfaces were microscopically observed. Then, measurement

TABLE 5

|  | r (μm) | R (μm) | r/R | W0(W) | W1(W) | W2(W) | $\frac{W1-W2}{W0-W2}$ (%) | Average Value in Thickness Deviation | Variation in Thickness Deviation | |
| --- | --- | --- | --- | --- | --- | --- | --- | --- | --- | --- |
|  |  |  |  |  |  |  |  |  | Positive Direction | Negative Direction |
| Example 13 | 134.0 | 142.3 | 0.942 | 0.44 | 0.253 | 0.241 | 6.03 | 1.07 | 0.13 | 0.05 |
| Example 14 | 135.3 | 139.9 | 0.967 | 0.44 | 0.264 | 0.242 | 11.11 | 1.03 | 0.1 | 0.03 |
| Comparative Example 11 | 136.3 | 138.9 | 0.981 | 0.44 | 0.278 | 0.243 | 17.77 | 1.02 | 0.1 | 0.02 | was conducted on the magnitude of thickness deviation in the respective outer claddings of the amplifying optical fibers, and average values and variations in thickness deviation were found. Table 5 shows the result.

As seen from the result shown in Table 5, even in the case where variations were taken into consideration, the amplifying optical fibers of Examples 13 and 14 each had a thickness of the outer cladding equal to or less than 1.4 at a thick portion where the thickness of the outer cladding at the thinnest portion was defined as 1. Hence, it was found that the amplifying optical fibers of Examples 13 and 14 achieve effective suppression of leakage of pumping light.

As described above, the amplifying optical fibers of Examples 1 to 14 showed the result that r/R thereof is equal to or less than 0.97, and that, in this case, the ratios of the power of skew light to absorbable light are less than 13% regardless of the outer shapes of the claddings. Further, in the case where r/R is equal to or less than 0.96, a result was obtained such that the ratios of the power of skew light to absorbable light are less than 10% regardless of the outer shapes of the claddings.

Further, the amplifying optical fibers of Examples 1 to 14 showed the result that r/R thereof is equal to or greater than 0.92, and that the thicknesses of the outer claddings at thick portions are equal to or less than 1.4 regardless of the outer shapes of the claddings even in the case that variations are taken into consideration, where the thicknesses of the outer claddings at the thinnest portions are defined as 1. Hence, it was found that amplifying optical fibers with r/R equal to or greater than 0.92 achieve effective suppression of leakage of pumping light.

Hence, with the optical fiber amplifiers using the amplifying optical fibers of Examples 1 to 14, it is considered that efficient optical amplification is effected.

INDUSTRIAL APPLICABILITY

The present invention provides an amplifying optical fiber allowing for efficient absorption of pumping light, and an optical fiber amplifier using the amplifying optical fiber.

DESCRIPTION OF REFERENCE NUMERALS

1 . . . optical fiber amplifier
11 . . . seed light source
12 . . . seed light propagating fiber
13 . . . pumping light source
13a . . . laser diode
14 . . . pumping light propagating fiber
15 . . . combiner
16 . . . double-clad fiber
20 . . . amplifying optical fiber
21 . . . core
22 . . . cladding
23 . . . outer cladding
24 . . . protective layer
C . . . circumscribed circle
c . . . inscribed circle

The invention claimed is:

1. An amplifying optical fiber, comprising:
a core doped with an active element; and
a cladding covering the core, and an outer cladding covering the cladding,
wherein the cladding has a polygonal outer shape in cross section, the polygonal outer shape being substantially a regular pentagon, a regular hexagon or a regular heptagon, and
the vertices of the polygonal outer shape are substantially rounded such that the cladding meets a relationship of $$0.92 \leq r/R \leq 0.97$$

where the outer shape has an inscribed circle of a diameter r and a circumscribed circle of a diameter R.

2. The amplifying optical fiber according to claim 1, wherein
the diameter r of the inscribed circle and the diameter R of the circumscribed circle establish a relationship of $$0.92 \leq r/R \leq 0.96.$$

3. The amplifying optical fiber according to claim 1, wherein the polygonal shape has vertices by an odd number.

4. The amplifying optical fiber according to claim 1, wherein the polygonal shape is heptagonal.

5. The amplifying optical fiber according to claim 1, wherein the cladding includes a plurality of cladding layers.

6. An optical fiber amplifier, comprising:
the amplifying optical fiber of any one of claims 1, 3, 4, and 5; and
an pumping light source for outputting pumping light to be input to the amplifying optical fiber.

* * * * *